US008827200B2

(12) United States Patent
Radu

(10) Patent No.: US 8,827,200 B2
(45) Date of Patent: Sep. 9, 2014

(54) FLYING VEHICLE

(76) Inventor: Bogdan Radu, Shelton, CT (US)

( * ) Notice: Subject to any disclaimer, the term of this patent is extended or adjusted under 35 U.S.C. 154(b) by 60 days.

(21) Appl. No.: 13/618,764

(22) Filed: Sep. 14, 2012

(65) Prior Publication Data

US 2013/0068876 A1 Mar. 21, 2013

Related U.S. Application Data

(60) Provisional application No. 61/535,448, filed on Sep. 16, 2011.

(51) Int. Cl.
*B64C 37/02* (2006.01)
*B60F 5/02* (2006.01)

(52) U.S. Cl.
CPC ........................................ *B60F 5/02* (2013.01)
USPC ............................................. 244/2; 244/23 B

(58) Field of Classification Search
USPC .................. 244/2, 12.4, 23 A, 23 B, 55, 56
See application file for complete search history.

(56) References Cited

U.S. PATENT DOCUMENTS

| | | | |
|---|---|---|---|
| 1,718,577 A | 6/1929 | Pitcairn | |
| 2,423,095 A | 7/1947 | Gibson | |
| 2,713,393 A | 7/1955 | Isacco | |
| 3,065,938 A | 11/1962 | Calkins | |
| 3,162,401 A | 12/1964 | Hopwood | |
| 3,494,575 A * | 2/1970 | Budworth | 244/2 |
| 4,685,410 A | 8/1987 | Fuller | |
| 4,856,732 A * | 8/1989 | Eickmann | 244/2 |
| 5,141,173 A * | 8/1992 | Lay | 244/2 |
| 5,360,367 A | 11/1994 | Ho | |
| 5,505,407 A | 4/1996 | Chiappetta | |
| 5,810,638 A * | 9/1998 | Wood | 446/73 |
| 5,890,441 A * | 4/1999 | Swinson et al. | 244/12.3 |
| 5,915,649 A * | 6/1999 | Head | 244/7 A |
| 6,138,943 A * | 10/2000 | Huang | 244/2 |
| 6,517,026 B1 * | 2/2003 | Smith | 244/2 |
| 6,824,095 B2 * | 11/2004 | Mao | 244/12.5 |
| 6,860,449 B1 * | 3/2005 | Chen | 244/12.1 |
| 7,410,122 B2 * | 8/2008 | Robbins et al. | 244/12.3 |
| 7,959,104 B2 * | 6/2011 | Kuntz | 244/2 |
| 8,376,263 B2 * | 2/2013 | Eames | 244/2 |
| 8,453,962 B2 * | 6/2013 | Shaw | 244/17.23 |
| 8,453,963 B2 * | 6/2013 | Liu | 244/23 B |
| 2002/0139894 A1 * | 10/2002 | Sorensen | 244/2 |
| 2003/0094537 A1 * | 5/2003 | Austen-Brown | 244/7 R |
| 2006/0016930 A1 * | 1/2006 | Pak | 244/12.4 |
| 2008/0251308 A1 * | 10/2008 | Molnar et al. | 180/209 |
| 2010/0181414 A1 * | 7/2010 | Lopez, Jr. | 244/12.4 |
| 2010/0294877 A1 * | 11/2010 | Jianu | 244/2 |
| 2011/0036938 A1 * | 2/2011 | Blomeley | 244/2 |
| 2011/0042507 A1 * | 2/2011 | Seiford, Sr. | 244/2 |
| 2011/0168834 A1 * | 7/2011 | Yoeli | 244/12.3 |
| 2011/0192931 A1 * | 8/2011 | Jung | 244/2 |
| 2011/0315806 A1 * | 12/2011 | Piasecki et al. | 244/2 |
| 2012/0048989 A1 * | 3/2012 | Eames | 244/2 |
| 2013/0112804 A1 * | 5/2013 | Zhu | 244/2 |
| 2013/0206919 A1 * | 8/2013 | Shachor et al. | 244/23 A |

\* cited by examiner

*Primary Examiner* — Christopher P Ellis
*Assistant Examiner* — Medhat Badawi
(74) *Attorney, Agent, or Firm* — Shoemaker and Mattare

(57) ABSTRACT

A vehicle has a roadable configuration similar to an automobile in which multiple rotors are stowed within the vehicle, and a flying configuration in which the rotors are deployed from the vehicle, allowing it to fly like a VTOL/STOL aircraft or a helicopter.

18 Claims, 19 Drawing Sheets

FLYING VEHICLE

This application claims benefit of provisional patent application 61/535,448, filed Sep. 16, 2011.

BACKGROUND OF THE INVENTION

This invention relates generally to a convertible vehicle which can drive on the ground, move on water, and fly, with minor configuration changes.

Some aircraft are known which, like the V22 Osprey aircraft configuration, have rotors that can tilt, allowing aircraft vertical take-off and landing.

Helicopters' rotors can be tilted within certain limits, which is absolutely essential for their control. Yet, despite having the capability of six degrees of freedom for moving along or rotating around all three axes during flight configuration, helicopters on the ground usually have only very limited mobility, or none at all.

Roadways are generally used by people driving land vehicles. The roads are becoming more and more congested due to the increased number of vehicles. Roads congestion creates frustration to those trapped in them, wasting their time.

Therefore, there is a need for a vehicle for personal transportation that can bypass congested roads, traverse water areas and to be able to fly over land or water.

Some prior solutions are disclosed in U.S. Pat. Nos. 5,141,173, 7,959,104 and 7938358. Those patents are incorporated herein by reference.

SUMMARY OF THE INVENTION

The present invention provides a vehicle, with internal combustion, air, electrical or hybrid power, having (a) a roadable land/amphibious vehicle configuration in which the vehicle wheels are powered during the ground/water operations, and (b) a flight configuration in which rotor blades are powered and create air pressure jets that sustain the vehicle in the air allowing it to have six degrees of freedom during the air operations.

The mechanical, air, electrical or hybrid systems used for powering the flying vehicle, allow the driver/pilot to selectively switch between an electric drive and an electric drive combined with a combustion engine for extended ground travel.

The electric drive vehicle capability could be used for city or outside city type drive and is environment friendly having noise and emission free.

The vehicle can have a conventionally mounted gasoline or diesel type engine, or can use a turbo-shaft or turbine type engine.

A spark combustion, diesel or turbofan engine is preferably used for extended high speed and high acceleration situations, and could be used for powering a generator for producing electricity for direct use or storage. Alternatively, the engine could power an air compressor. In that case, the compressed air produced could be stored in reservoirs or used to drive air motors.

In order to compensate the fast charging of the electric batteries, some solar power panels can be attached on the outside top or side areas of the vehicle.

The flying vehicle of the present invention stores its rotors in a compact configuration inside the vehicle body during the roadable ground mode or during amphibious operations for minimizing the vehicle size and for protecting the blades from environmental damage. In the flying mode, the vehicle uses the multiple unfolded rotors' fans to create the necessary lift to fly the vehicle.

During the flying configuration of the flying vehicle, additional compressed air jets powered by compressed air can be used for additional lift and/or to fine steering control of the vehicle. The created compressed air is stored in reservoirs inside the vehicle body. The compressed air reservoirs can be recharged by an on-board compressor driven by a combustion engine or electric motor.

For water operations configuration, additional compressed air jets powered by compressed air can be used for additional floatation or propulsion and/or for fine steering control of the vehicle.

The vehicle should be as agile and as maneuverable as possible, like a car or amphibious vehicle, and, like a helicopter, able to move along and around all three axes during flight. The present flying vehicle will give its users the ability to travel anywhere that automobiles and amphibious vehicles can, and also to enter other areas now accessible only by helicopters.

The presently described flying vehicle has a roadable land/amphibious capability as well as an air capability, having also a VTOL/STOL capability. In its flight mode, the vehicle is easy to operate and control. The invention eliminates the complicated construction and operational requirements of helicopters, and is relatively easier to fly.

The vehicle has a high maneuverable capability that is providing an agile road and air transportation. The conversion between road and air transportation modes is simple and can be accomplished in a matter of seconds.

By independently controlling the rotors speeds, or by independently changing their blade pitch, one can obtain the necessary maneuverability of the vehicle. The vehicle can take off or land completely vertical, like a helicopter, or it can take off and land through different ground related angles, like an airplane.

A primary object of the present invention is to provide a highly maneuverable land, water and air vehicle.

Another object is to provide a compact way of packing and stowing the rotors inside the vehicle body, and to deploy them for flight operations.

An advantage of the invention is that it enables independent control of the individual rotors without complicated mechanical force-distribution couplings.

Another advantage of the invention is that the rotor/propeller can be adapted to current flight conditions or the current airflow speed in the rotor plane, thus improving the performance and efficiency of the rotor/propeller.

Yet another advantage is that the invention enables usage of the side unpacked rotors for an easy flight configuration and enables improved, variable control of the vehicle.

The invention enables the main rotor planes to be fixed in forward flight so as to generate lift, with the rotors/propellers having to generate only thrust.

Because of its brushless motor configuration, in comparison with frequency-controlled three-phase motors, the invention provides high torque at both low and high rotational speeds. This results in a long service life without excessively high energy storage weights due to the high specific electrical energy.

Another object of the present invention is to provide a rapid configuration change between the land/water and air operability of the vehicle.

Another object of the present invention is to provide a rapid configuration change between the air and land water operability of the vehicle.

Another object of the present invention is to provide a highly maneuverable, agile and versatile transportation vehicle.

In case that the flying vehicle object of the present invention is used with a complete remote-controlled system of the flying device described here this will provide the observation in areas or land or buildings that are difficult to be accessed and/or which present high danger to Special Forces and other operational personnel.

The other object of the flying vehicle of the presented invention is to analyze different ground, water and building areas quietly and precisely, and can also be used to provide an overview from the air or to cover a great description of the accessible or inaccessible searched areas.

In case that the flying vehicle object of the present invention is used with a complete remote-controlled system can analyze, detect or eliminate the danger from different areas without the usage of the human help.

The other object of the present flying vehicle invention is to go above and around different obstacle existent in some hard to access or danger areas on the battle field.

If the present flying vehicle invention is used as a part of some Special Police or military operations, the vehicle can be used of caring guns, munitions or other necessary equipment for these types of operations.

The other object of the present flying vehicle invention is to assure special operations and bringing back individual troops or persons from dangerous or not an easy to access areas in the battle field or inaccessible mountains operations.

The primary object of the present invention is to provide a vertical take-off and landing vehicle for land, water and air transport that will overcome any of the prior similar type devices.

Another object of the flying vehicles of claim 1 is that is having during roadable land/amphibious vehicle configuration the general look of a car vehicle will not be differentiated from all the surrounding vehicles.

Another object of this present invention is efficiently powered mechanically by an internal combustion engine, electrically by rechargeable battery, with air from the air compressed storage reservoirs or by a hybrid type configuration during land, water and air travel.

Another object of this personal type of present invention is that has a general appearance of a land vehicle and will move on the ground and will fly using rotors in the manner of a helicopter so the vehicle will fly in the air.

Another object of this type of present invention is to provide a vertical take-off and landing vehicle from land, water and air transport by using a microprocessor that communicate with all the vehicle sensors which can include but are not limited to altitude, accelerometers, radar or gyroscopic sensors. The microprocessor gets data from these types of sensors and actuates the rotors, the rotors' blades or the air jet nozzles accordingly in order to maintain stability during flight.

Another object of this type of present invention is controlled by a compound steering wheel and a steering controller.

Another object of this type of present invention is that the vehicle also includes brakes and the like that resemble the equipment associated with cars so a driver can operate the land/flying vehicle in the manner of a car with which the drive/pilot operator is familiar.

Another object of this type of personal present invention is that can thus be operated in the manner of a car or amphibious vehicle, but will also have flight capability in the manner of a Vertical Take-Off and Landing (VTOL)/Short Take-off and Landing (STOL) in a manner of an airplane or a helicopter vehicle, and thus will be useful in avoiding and relieving congestion on the roadways and fly over portion of land or water.

Another object of this type of present invention is designed to be easy to operate on the land's roads, off roads, on the water and on the air, so it will be attractive to the general public and Special Services operators.

The flying vehicles of claim 1 is that the vehicle will be as agile and as maneuverable as a regular land vehicle and as agile and as maneuverable as a helicopter so the vehicle can be maneuvered and operated in congested areas while still being safe.

This type of present invention will not be stuck in the congested areas similar with land vehicles and thus will provide significant advantages to an operator. Since the vehicle is agile and maneuverable, it will be attractive to military operators as well as to other operators such as police, fire, rescue, military and civil personnel.

This type of present invention can also be used by the airline industry as a shuttle between locations in a single airport, or even between locations on different airports' location. This type of vehicle will provide an important new product for both the land vehicle manufacturers and aircraft type manufacturers.

This type of present invention can also be used by emergency ambulance services for manned or unmanned type operation for rescuing people from limited access or dangerous area. This type of vehicle will provide an important new product for both the land vehicle manufacturers and aircraft type manufacturers.

The present invention can also be used by special services for manned or unmanned type operation for deploying people or materials to a limited access or dangerous area.

The above objects of the invention are obtained by the invention described in the following detailed description and the accompanying drawings.

BRIEF DESCRIPTION OF THE DRAWINGS

In the accompanying drawings,

FIG. 9 shows the flying vehicle during emergency usage of the parachute in case of different types of failures.

DESCRIPTION OF THE PREFERRED EMBODIMENT

Figure 10:
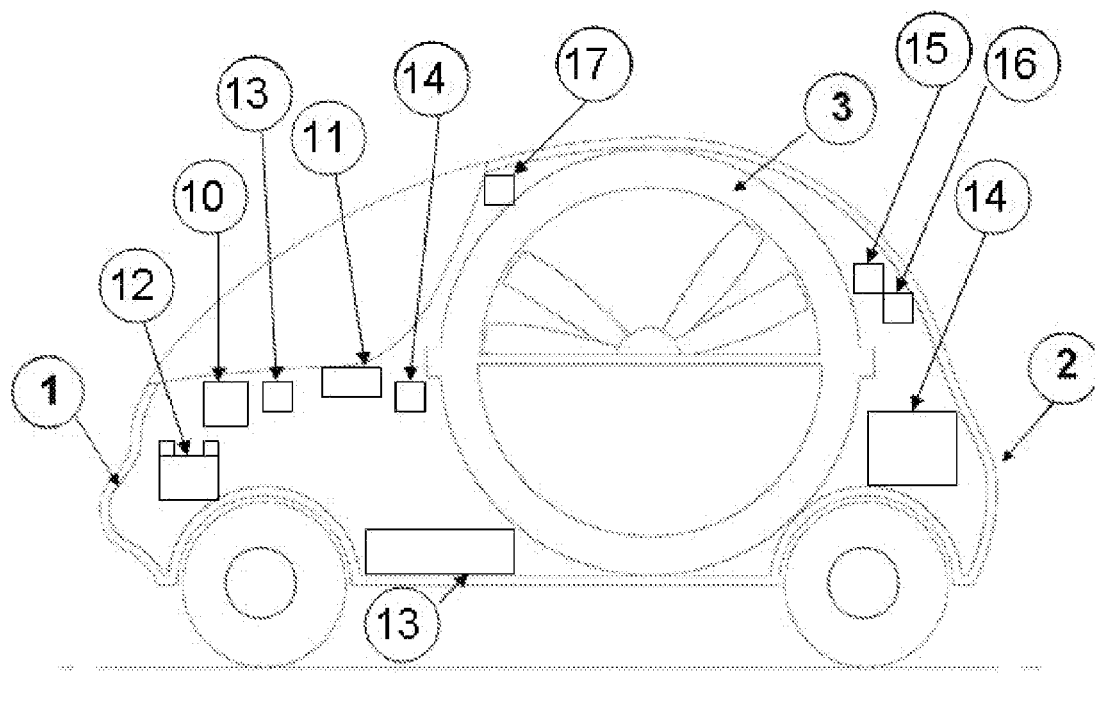
FIG. 10 is a left side view of the vehicle, showing its component diagramatically.
Figure 11:
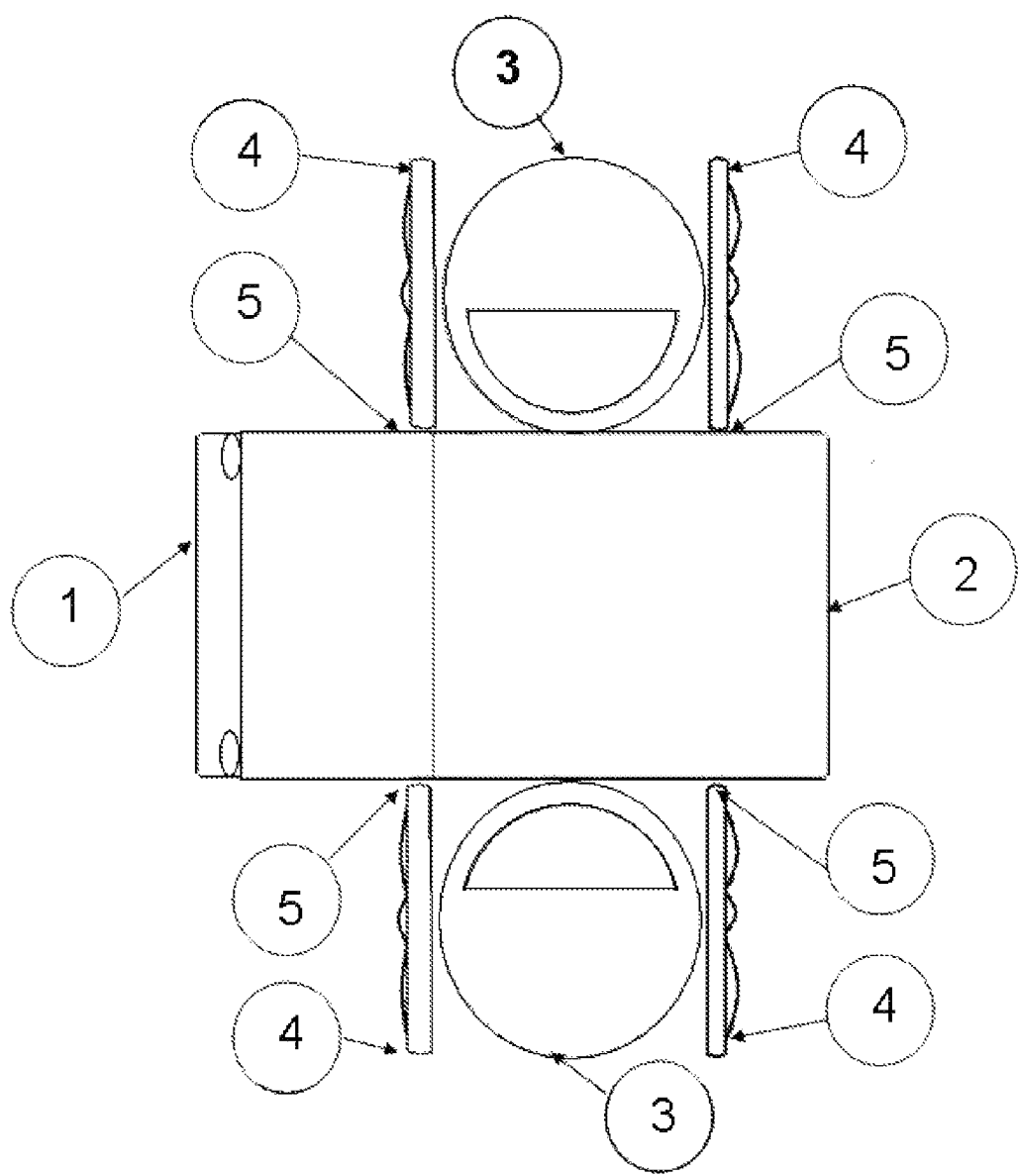
FIG. 11 is a top plan view of the vehicle, with its doors open and rotors deployed.

Referring to the above figures, the present invention is embodied in a flying vehicle that operates in the manner of a Vertical Take-Off and Landing (VTOL)/Short Take-off and Landing (STOL) or a helicopter type aircraft but is sized and designed to be similar with a personal land vehicle. The vehicle comprises a main body that is in the shape of a land car/amphibious vehicle and which has a front end 1, a rear end 2 and side storage compartment cover doors 3 which cover the rotors/propellers 4 (FIG. 10). The rotors/propellers can open and rotate independently with the mechanism 5 around the transverse axles 7 (FIG. 11). The main body further includes side rotors storage compartments with the intent of storing the rotor and their blades during the land/water operation of the vehicle. The main body further includes the side storage compartment cover doors that in the closed configuration cover the rotors and their blades in of the vehicle land configuration and in the same close configuration cover the rotors storage compartments during the air operating vehicle configuration.

Figure 1:
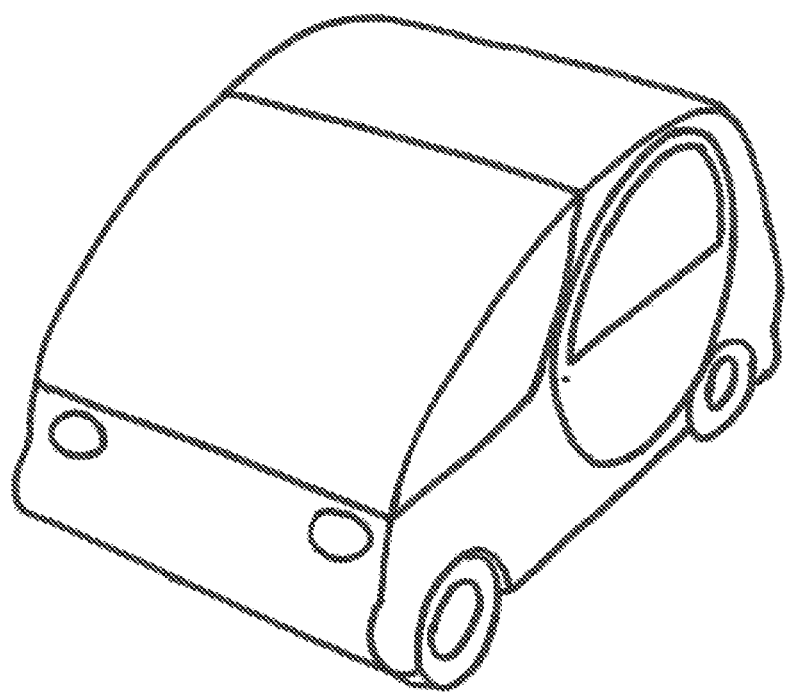
FIG. 1 shows a view of the preferred embodiment of a flying vehicle having a roadable land/amphibious configuration.
Figure 2:
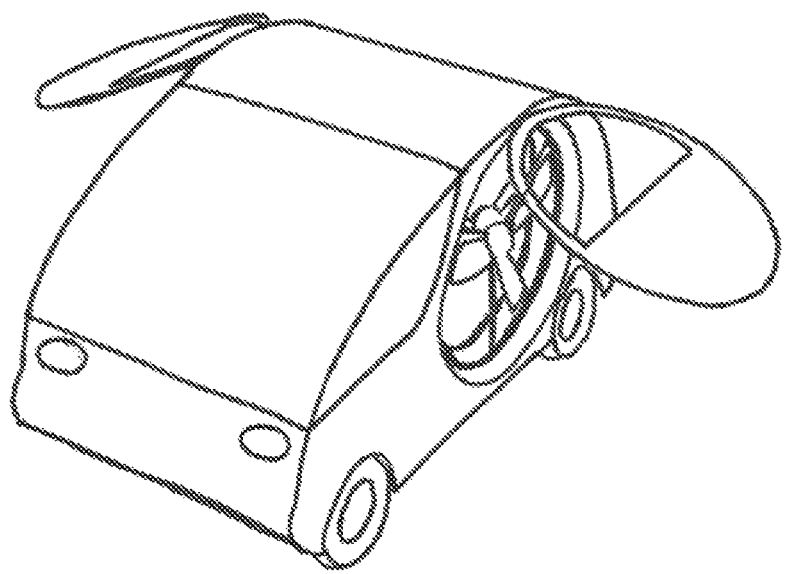
FIG. 2 shows a view of the preferred embodiment of a flying vehicle having the side doors covering the folded rotors in the open position.
Figure 3:
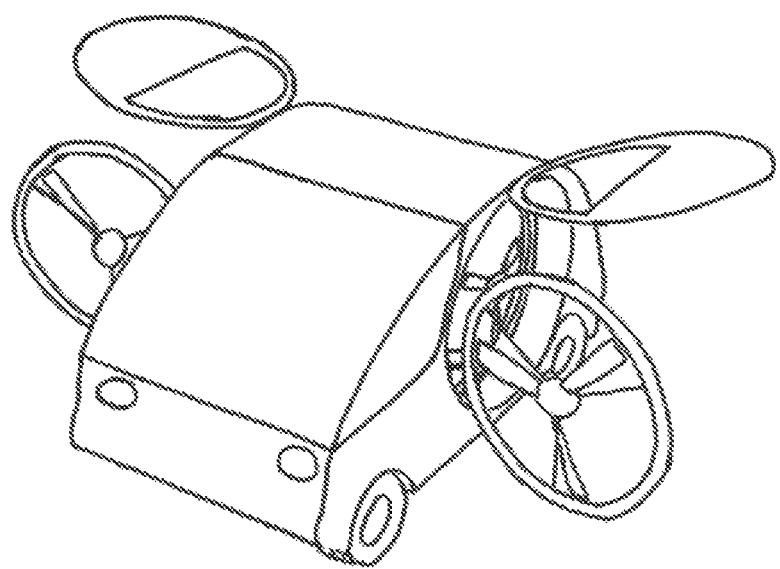
FIG. 3 shows a view of the preferred embodiment of a flying vehicle having the side doors in the open position and the forward rotors in the unfolded vertical position.
Figure 4:
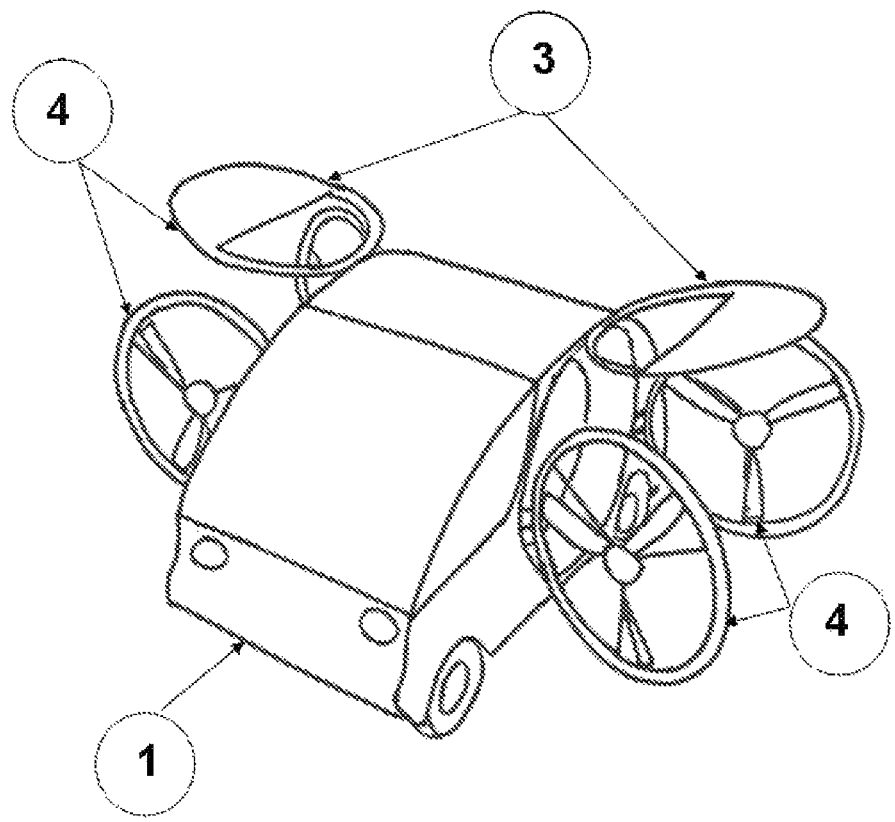
FIG. 4 shows a view of the preferred embodiment of a flying vehicle having the side doors in the open position, the forward rotors in the unfolded vertical position and the aft rotors in the unfolded vertical position.
Figure 5:
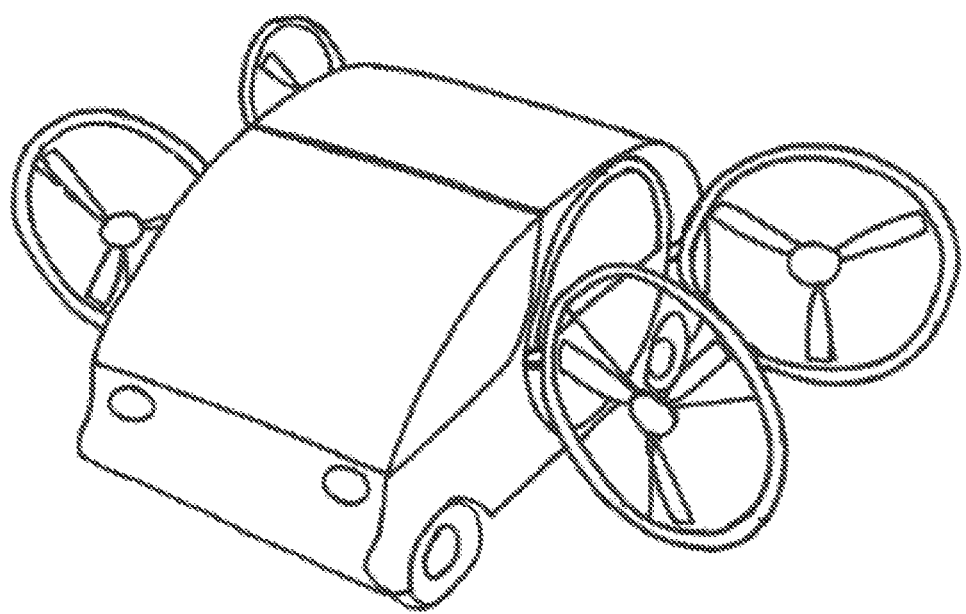
FIG. 5 shows a view of the preferred embodiment of a flying vehicle having the forward and aft rotors in the unfolded vertical position and the side doors closed for flying position.
Figure 6:
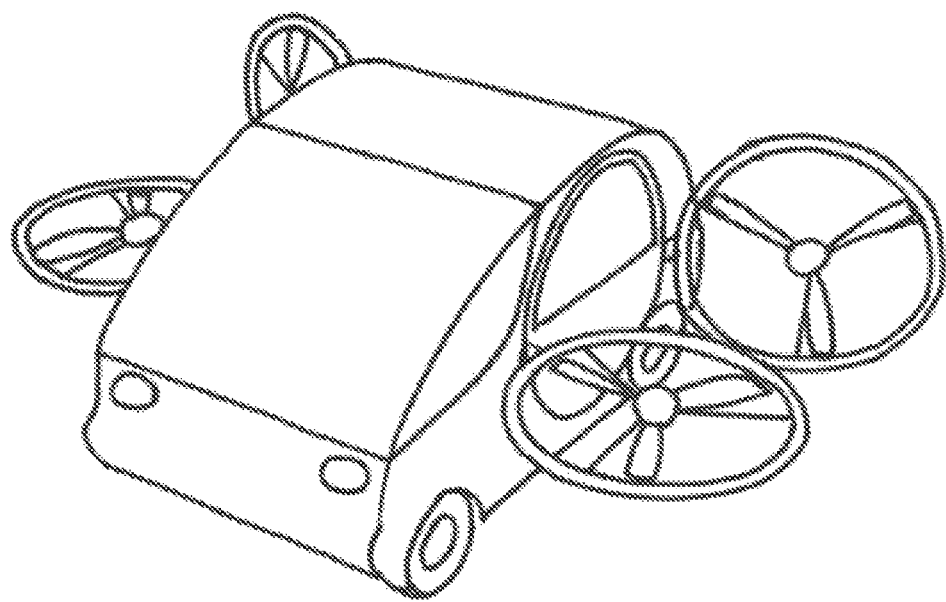
FIG. 6 shows a view of the preferred embodiment of a flying vehicle having the forward rotors unfolded and rotated in the horizontal position and the aft rotors in the unfolded vertical position.
Figure 7:
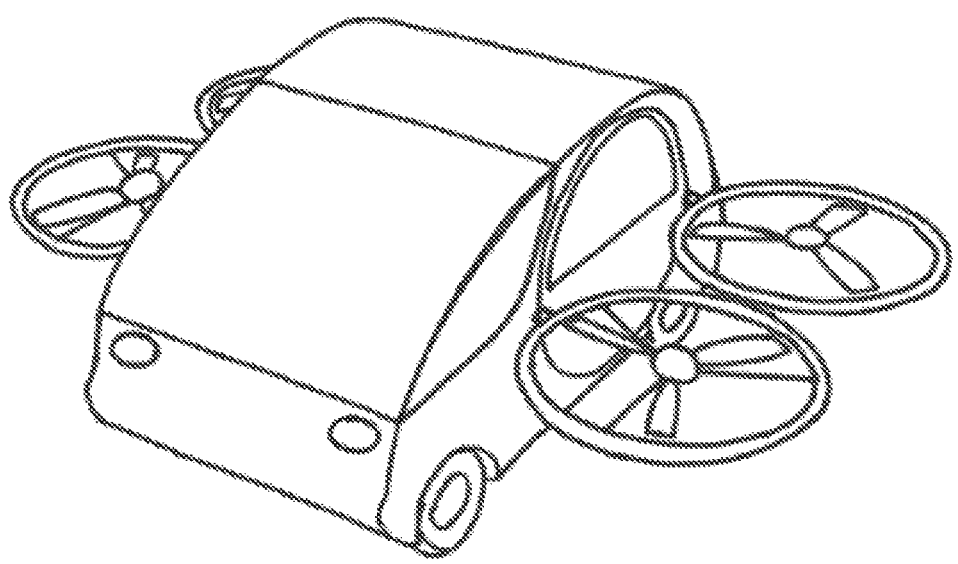
FIG. 7 shows a view of the preferred embodiment of a flying vehicle in flying configuration, having the forward and aft rotors unfolded and rotated in the horizontal position.
Figure 8:
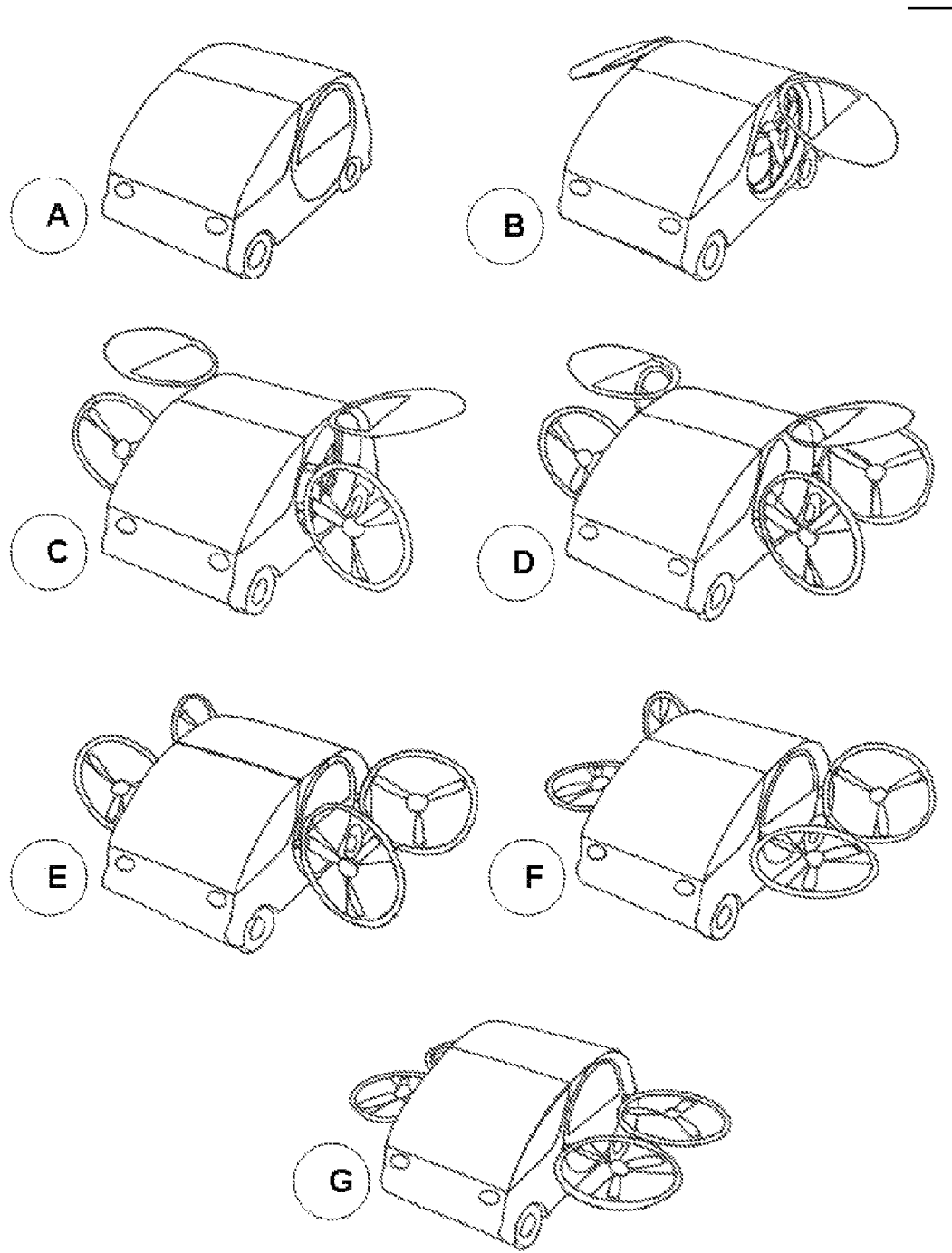
FIG. 8 shows a view of the preferred embodiment of a flying vehicle during its stages of the transformation between the roadable land/amphibious configuration to the flying configuration. Views A-G correspond to FIGS. 1-7 respectively.
Figure 9:
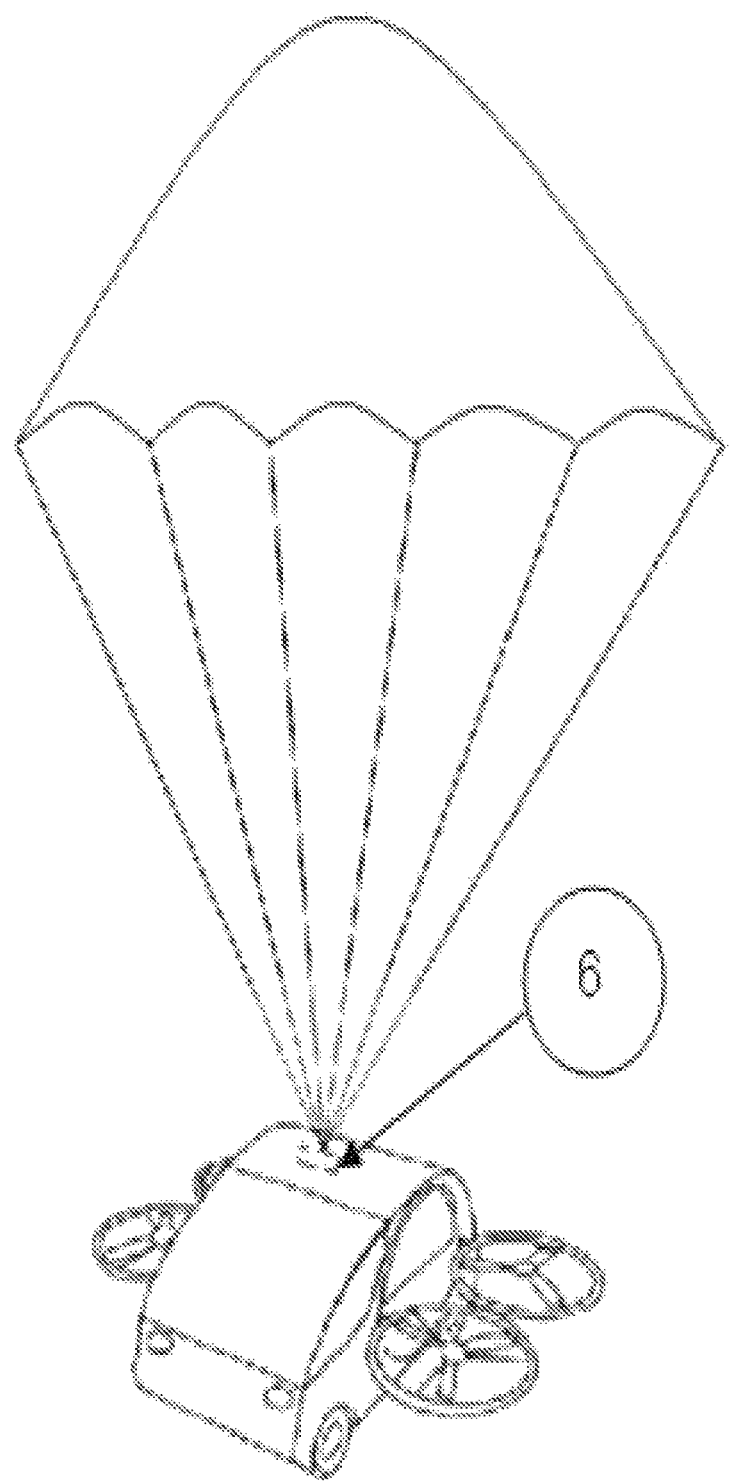
FIG. 9 shows the flying vehicle—step by step basic stages of transformation, again corresponding to FIGS. 1-7.

The transformation of the vehicle between the land and air configuration is minimal and can be rapidly done automatically, with no need of the operator help in a matter of seconds, as shown schematically in FIG. 7, FIG. 8 and Fig 11.

Figure 16:
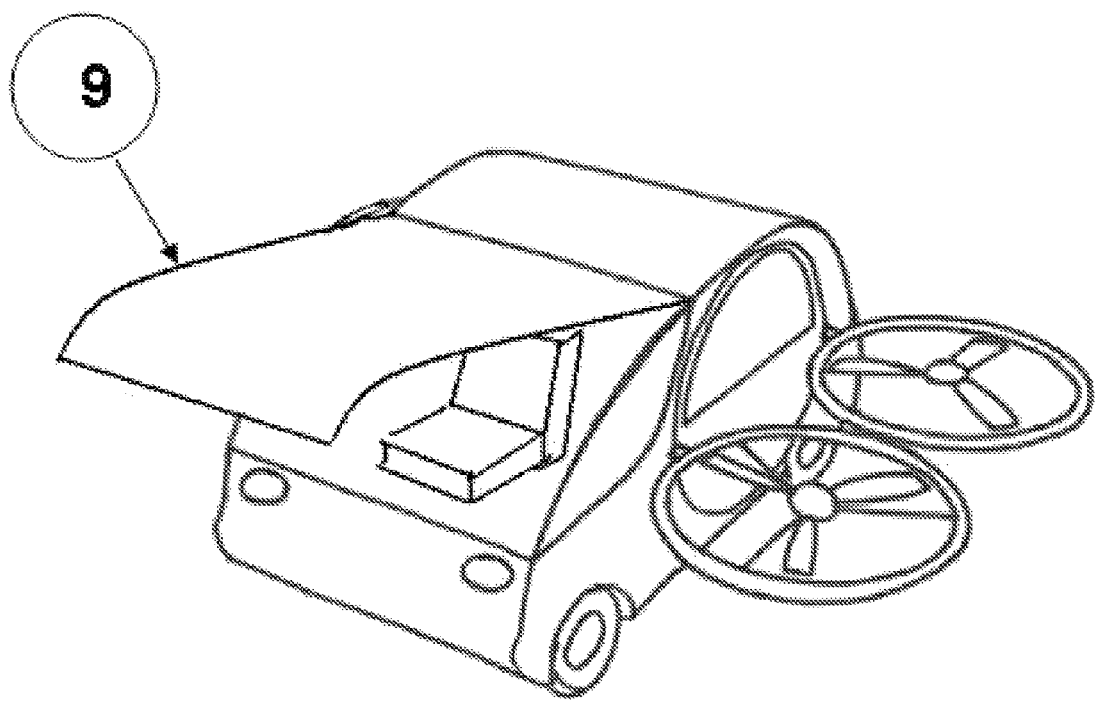
FIG. 16 shows the flying vehicle passenger access door.
Figure 17:
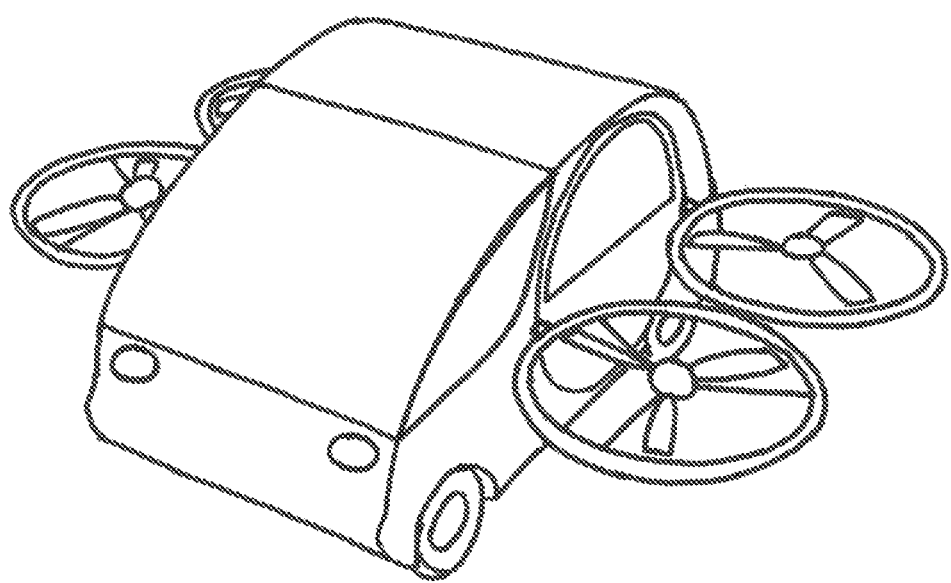
FIG. 17 isometric flying vehicle view.

The operator of the vehicle can enter the vehicle through a front 9 (FIG. 16), rear or side entrance type access door.

During land operation, roadable land/amphibious mode, the side rotors are stored in the side storage compartments.

Figure 12:
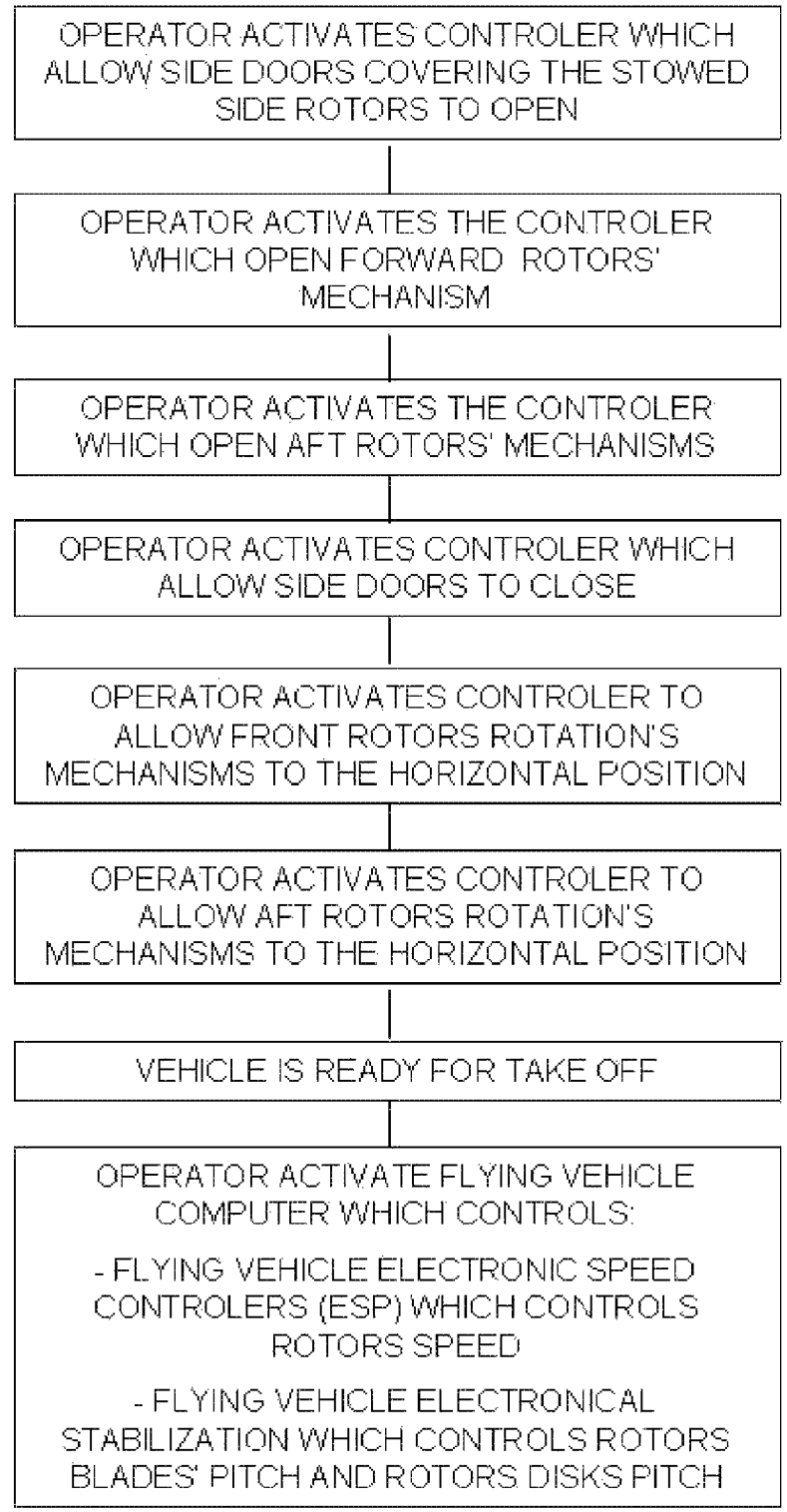
FIG. 12 shows the flying vehicle block diagram controlling the flying vehicle transformation from the roadable/amphibious vehicle to the flying vehicle configuration.
Figure 18:
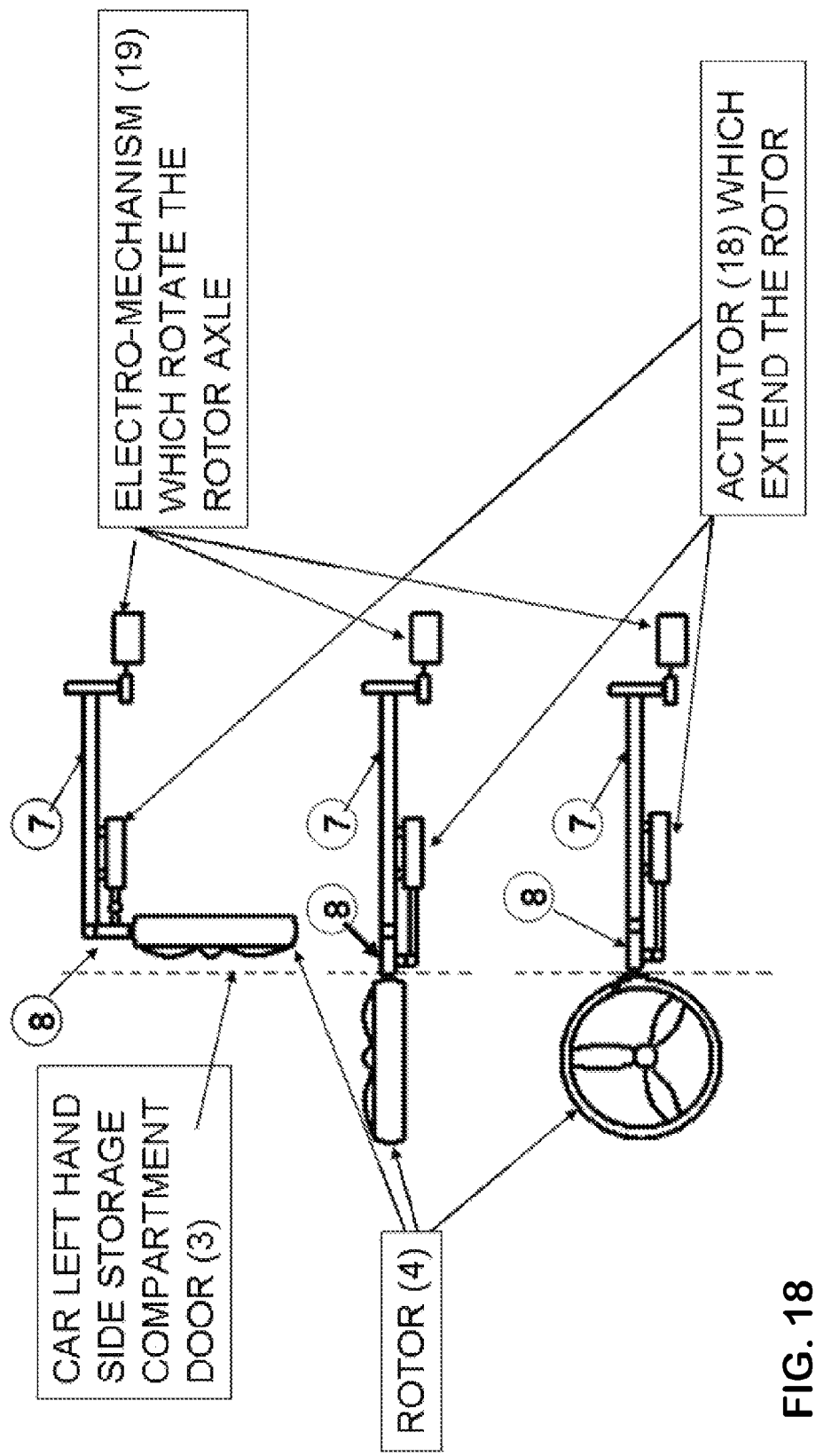
FIG. 18 shows a rotor deployment actuator and rotation mechanism.
Figure 19:
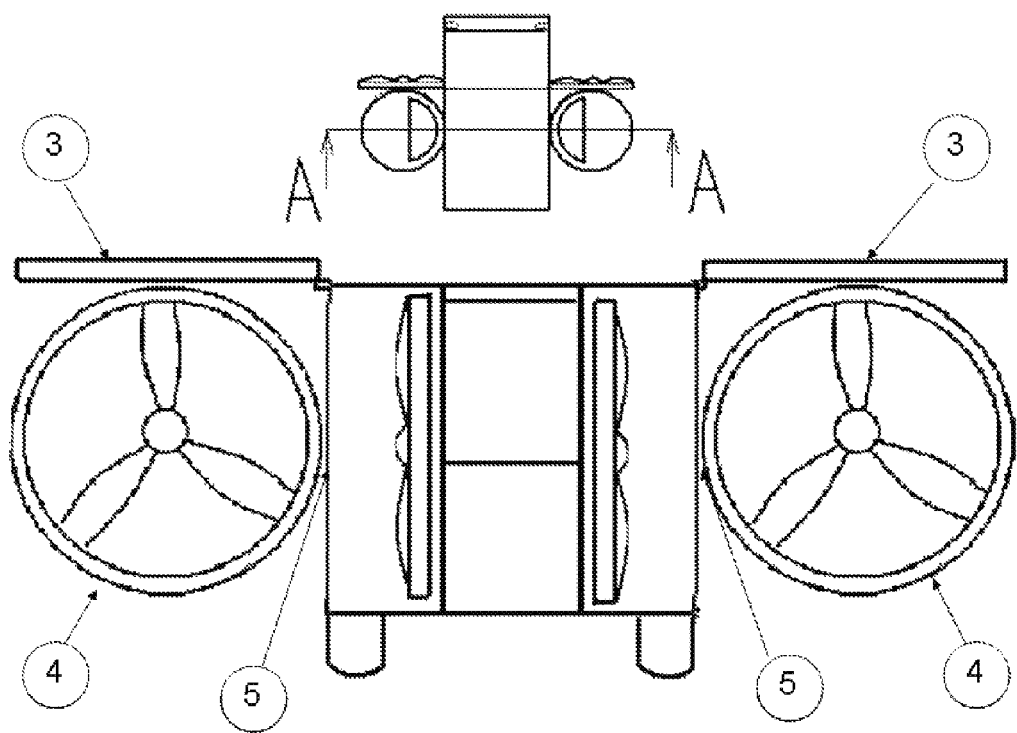
FIG. 19 is a section taken on the plane A-A in the inset, showing the doors open, front rotors deployed, and rear rotors stowed.

During preparation for take off, in a transition mode, described in Fig 7, FIG. 8 and Fig 12, the side doors, open allowing the side rotors to be deployed, having a close to vertical configuration, as when stored (FIG. 18). After rotors have exited the storage compartments and after the rotors clear the open/close patch of the side doors, the side doors move in the closed position, for land vehicle operation.

The actuator 18 pushes the stored rotors (inside the vehicle body) to the open position outside the vehicle body (FIG. 18). The electromechanism 19 rotates the levers 7, 8 ninety degrees together with the rotors 4 from the rotor open position to the rotor flying position (FIG. 18).

When the side storage compartment cover doors are closed completely, the side rotors have a horizontal position, which is the basic position for Vertical Take-Off and Landing (VTOL).

Figure 15:
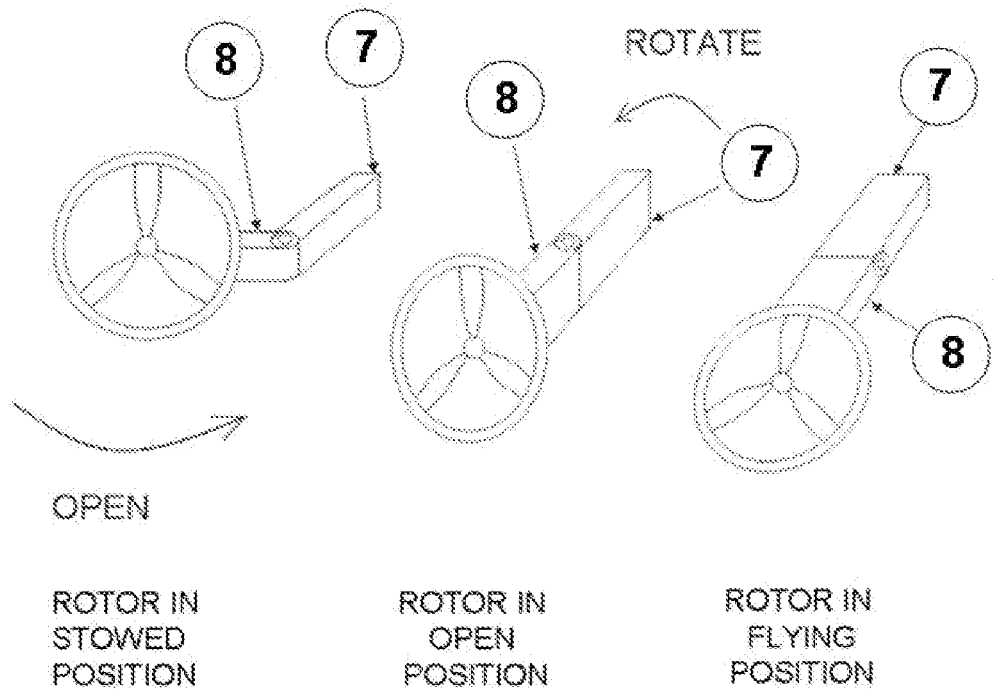
FIG. 15 shows the schematic of rotors' control mechanism allowing stowed, open and fly configurations.

During flight, the rotors spin around their rotational axes; the rotors may have blade pitch change capability. The side rotors can rotate around the rotors opening axes 7 or 8, in order to provide a high maneuverable air movement of the vehicle (FIG. 15). Also, the rotors' speed can and blade pitch can be adjusted based of the vehicle needs.

Figure 13:
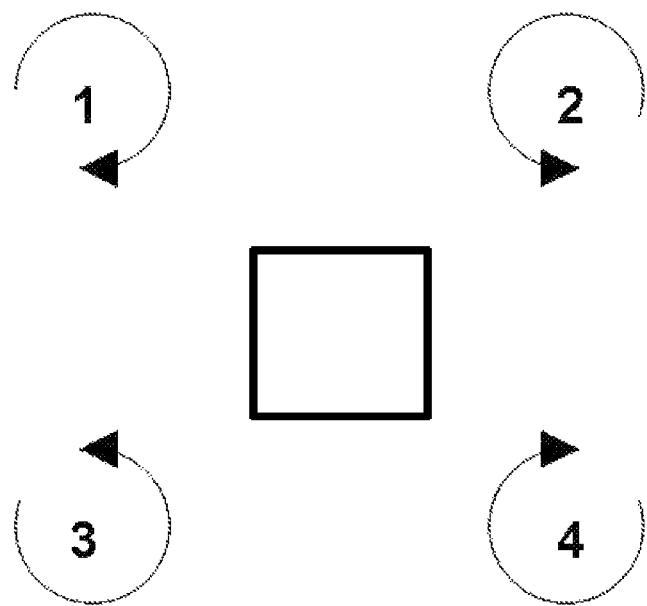
FIG. 13 shows the flying vehicle Gyroscopic type controller.

The flying vehicle computer microprocessor 10 (FIG. 10) receive signals from an altimeter 15, motion detectors sensors 16, a global positioning system (GPS) 17, and a gyroscoping type controller (Fig 13). The gyroscoping type controller (Fig 13) processes the signals coming from gyroscopes 11.

Figure 14:
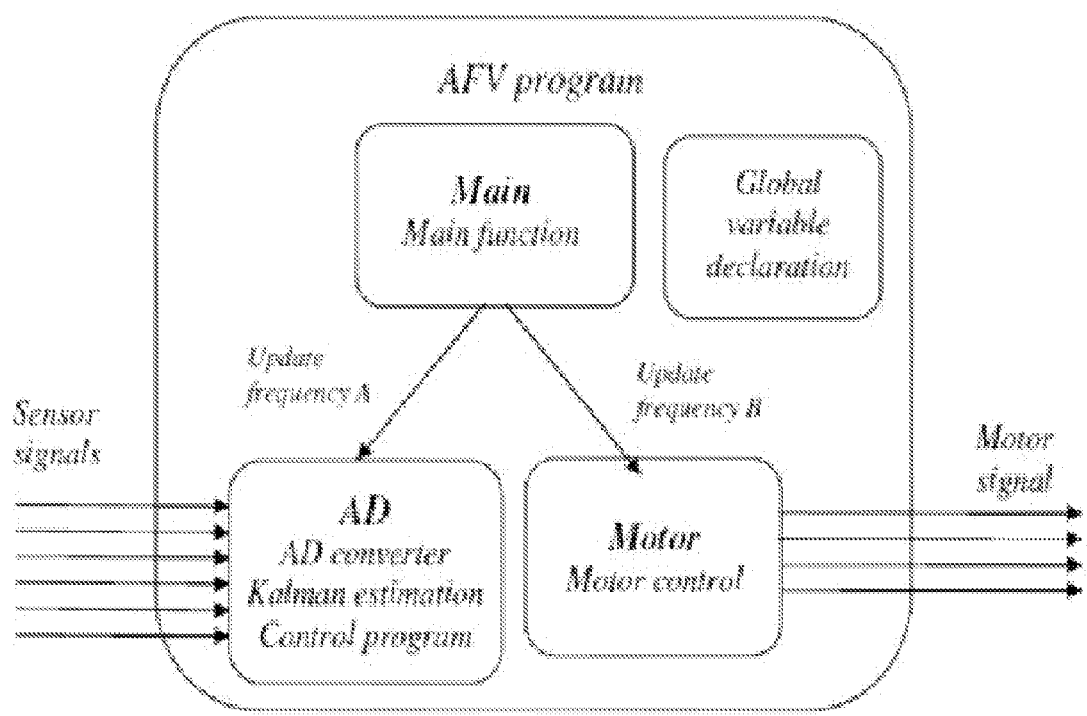
FIG. 14 shows the Autonomous Flying Vehicle Software (AFVS) program structure.

The processor may use new or existing Autonomous Flying Vehicle Software (AFVS) (FIG. 14) that will assure vehicle complete independent stabilization mode.

The present invention obtains power needed to the move the vehicle on roadways or on the water from either:
  a) an internal combustion, diesel or turbofan engine 14 (FIG. 10) which drive the vehicle's wheels through shafts, pinions and gears,
  b) an electric power supply, battery 12 (FIG. 10) or electric generator attached to a combustion, diesel, turboprop or turbofan engine, which provide the necessary electrical energy to drive the vehicle electric motors connected to vehicle wheels, or
  c) an air power supply, air from an air compressor attached to a combustion, diesel or turbofan engine, air from a turbofan engine or air from an air reservoir 13 (FIG. 10), to create the necessary energy to drive the vehicle wheels through a central or independent air driven motor on each of the vehicle's wheels.

Power needed to rotate the rotors—which provide lift to fly the vehicle and enable it to take off from land or water—comes from either:
  i) an internal combustion, diesel or turbofan engine which drive the rotors through shafts, pinions and gears,
  ii) an electric power supply, battery or electric generator attached to a combustion, diesel, turboprop or turbofan engine, which provide the necessary electrical energy to drive the rotors' electric motors, and/or
  iii) an air power supply, air from an air compressor attached to a combustion, diesel or turbofan engine, air from a turbofan engine or air from an air reservoir, to create the necessary energy to drive each of the vehicle rotors through a central or through independent air driven motor for each of the vehicle rotor, or to drive each of the vehicle rotors through a central turbine or through independent turbine for each of the vehicle rotor.

For emergency situations, the flying vehicle has benefit of the optional use of the manual or automatically deployed parachute for land or water landing.

The roadable land/amphibious configuration of the described flying vehicle is similar to an automobile in that it has multiple rotors packed in a very convenient and compact way.

The general shape of the described present invention, during ground or water operations, having the rotors packed in a very convenient and compact way inside the flying vehicle body and covered by doors, is similar with a car vehicle configuration. For the flying configuration of the described present invention, the unfolded and rotated rotors allow the vehicle to fly in the similar manner of VTOL/STOL or a helicopter and to have a similar look as a multiple rotors air vehicle.

The flying configuration of the described flying vehicle has the rotors unfolded and rotated in a horizontal position relatively to ground that allow the vehicle to fly in the similar manner of VTOL/STOL or a helicopter.

For the roadable land/amphibious configuration, the described flying vehicle has conventional pedals, controls and steering type mechanism so it can operate same as a car. For flying configuration, the flying vehicle has a control stick which is used during take off, flying and landing.

In order to transform to the flight configuration, the vehicle opens the side doors covering the compact stored rotors, unfolds the rotors, rotates the rotors from the stored vertical position into the flying horizontal position, closes the side doors and starts spinning the rotors in order to create the necessary lift for the vehicle to take off, fly and land.

The vehicle cabin, when closed, is hermetically sealed and can be pressurized.

This invention can be used for passengers' transportation by: private users, Special Forces, firefighting or rescue missions, police or other types of Military users. Built at a reduced scale, it could be operated by remote control Special Forces, firefighting rescue missions, police or other types of Military users, for surveillance of limited access areas or in very dangerous areas.

Since the invention is subject to modifications and variations, it is intended that the foregoing description and the accompanying drawings shall be interpreted as only illustrative of the invention defined by the following claims.

I claim:

1. A flying vehicle having a flying configuration and a road configuration, said vehicle comprising
    a body having the shape of an automobile or amphibious vehicle, said body defining a passenger compartment,
    at least one powered wheel for propelling the vehicle on land in said road configuration,
    at least two pairs of rotors for providing lift and propulsion to the vehicle in said flying configuration,
    said body further comprising a pair of side storage compartments, each of said storage compartments being adapted to house a pair of rotors when the rotors are not in operation,
    wherein each of the rotors can be moved between a stowed position inside a respective storage compartment and a deployed position outside said respective storage compartment,
    wherein when the rotors are in their stowed position, the rotors are in a vertical orientation, one pair of the rotors being stowed within each compartment, with one of the rotors behind the other in the lateral direction of the flying vehicle, and
    a pair of side doors hinged to body, said side doors being movable between an open door position permitting movement of the rotors between said stowed and deployed positions, a closed door position covering said compartments when the rotors are either stowed or deployed.

2. The flying vehicle of claim 1, further comprising an electromechanical system for opening and closing said side doors.

3. The flying vehicle of claim 1, further comprising an electromechanical system for moving each of the rotors between said stowed position and said deployed position.

4. The flying vehicle of claim 1, wherein each of said rotors can be rotated about an axis, transverse to an axis of rotation of the rotor, from a lift configuration to a thrust configuration, and further comprising an electromechanical system for moving each of the rotors from said lift configuration to said thrust configuration.

5. The flying vehicle of claim 1, wherein each of said rotors comprises at least one rotor blade having a fixed or adjustable blade pitch.

6. The flying vehicle of claim 1, further comprising an emergency parachute which may be deployed for emergency landing.

7. The flying vehicle of claim 1, wherein said body has a longitudinal axis and a transverse axis extending between opposed side rotors, and each rotor has a rotational axis, each rotor being configured to tilt relative to said transverse axis.

8. The flying vehicle of claim 1, further comprising at least two arms connected to said vehicle body, each arm including an outer part connected to a respective rotor and an inner part connected to the body, wherein each outer part can be rotated relative to a corresponding inner part to tilt its rotor independently of other rotors about a second transverse axis of the inner part.

9. The flying vehicle of claim 1, further comprising at least two hinged arms connecting the body to each respective rotor, whereby each rotor's axis can be vertically aligned relative to the ground and at non-vertical angles.

10. The flying vehicle of claim 1, wherein each of said motors is driven by an independently controllable motor.

11. The flying vehicle of claim 1, further comprising side rotors powered by electric motors from a battery or a generator driven by a combustion engine or having a connection coupling the combustion engine to said rotors or powered by air motors driven by compressed air.

12. The flying vehicle of claim 1, further comprising a steering mechanism for controlling flying direction by adjusting the speed, orientation, or blade pitch of the rotors.

13. The flying vehicle of claim 1, further comprising a speed control system, said control mechanism being adapted to vary the pitch of the rotor blades and the speed of the rotors.

14. The flying vehicle of claim 1, further comprising a power unit for driving said at least one powered wheel, said power unit being selected from the group consisting of:
    a) a combustion engine driving the powered wheel through a mechanical drive train,
    b) at least one electric motor connected to the powered wheel, and
    c) at least one air motor connected to the powered wheel.

15. The flying vehicle of claim 1, further comprising a power unit for driving the rotors during flight of the vehicle, said power unit being selected from the group consisting of:
    a) a combustion engine driving the rotors through a mechanical drive train,
    b) at least one electric motor connected to the rotors, and
    c) at least one air motor connected to the rotors.

16. The flying vehicle of claim 1, further comprising an air compressor and jet nozzles connected to said compressor, said nozzles being disposed on both sides of the vehicle so as to produce lateral movement of the vehicle.

17. The flying vehicle of claim 1, further comprising a stabilizing and navigational system comprising a computing processor, an altimeter, motion detectors, a gyroscope, and a Global Positioning System.

18. The flying vehicle of claim 1, further comprising radar and motion sensors situated inside and outside of the said vehicle body for the stabilization and navigation system, to provide 360 degree coverage and detect the presence of a nearby object that might present a threat to the vehicle.

* * * * *